United States Patent Office 3,389,016
Patented June 18, 1968

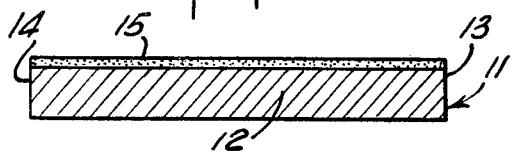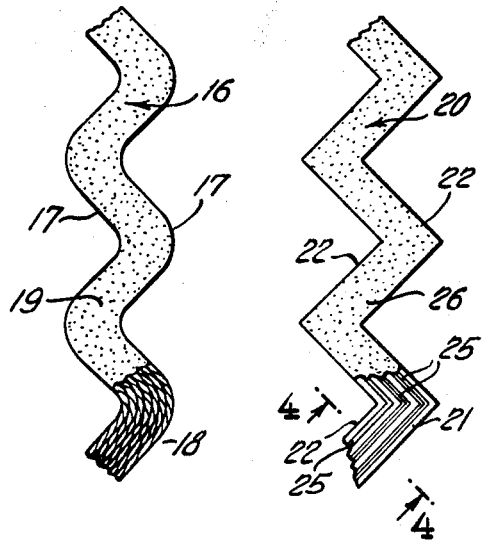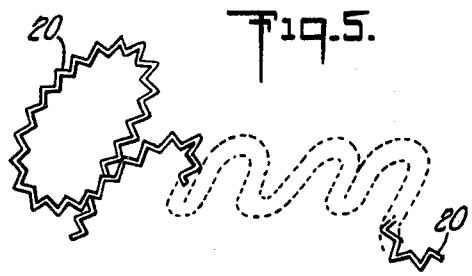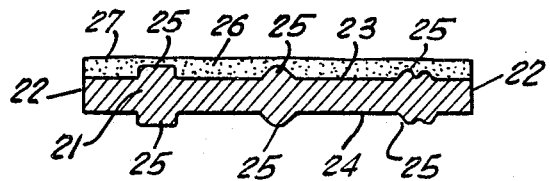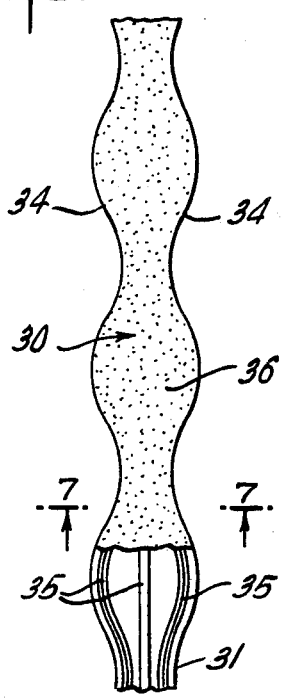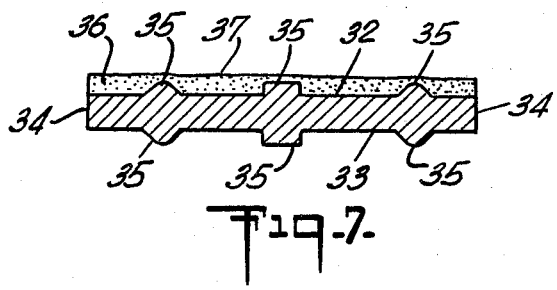
INVENTORS:
ALBERT HOLTZ
ROBERT H. LAMASON
BY
Charles A. Harris
ATTORNEY.

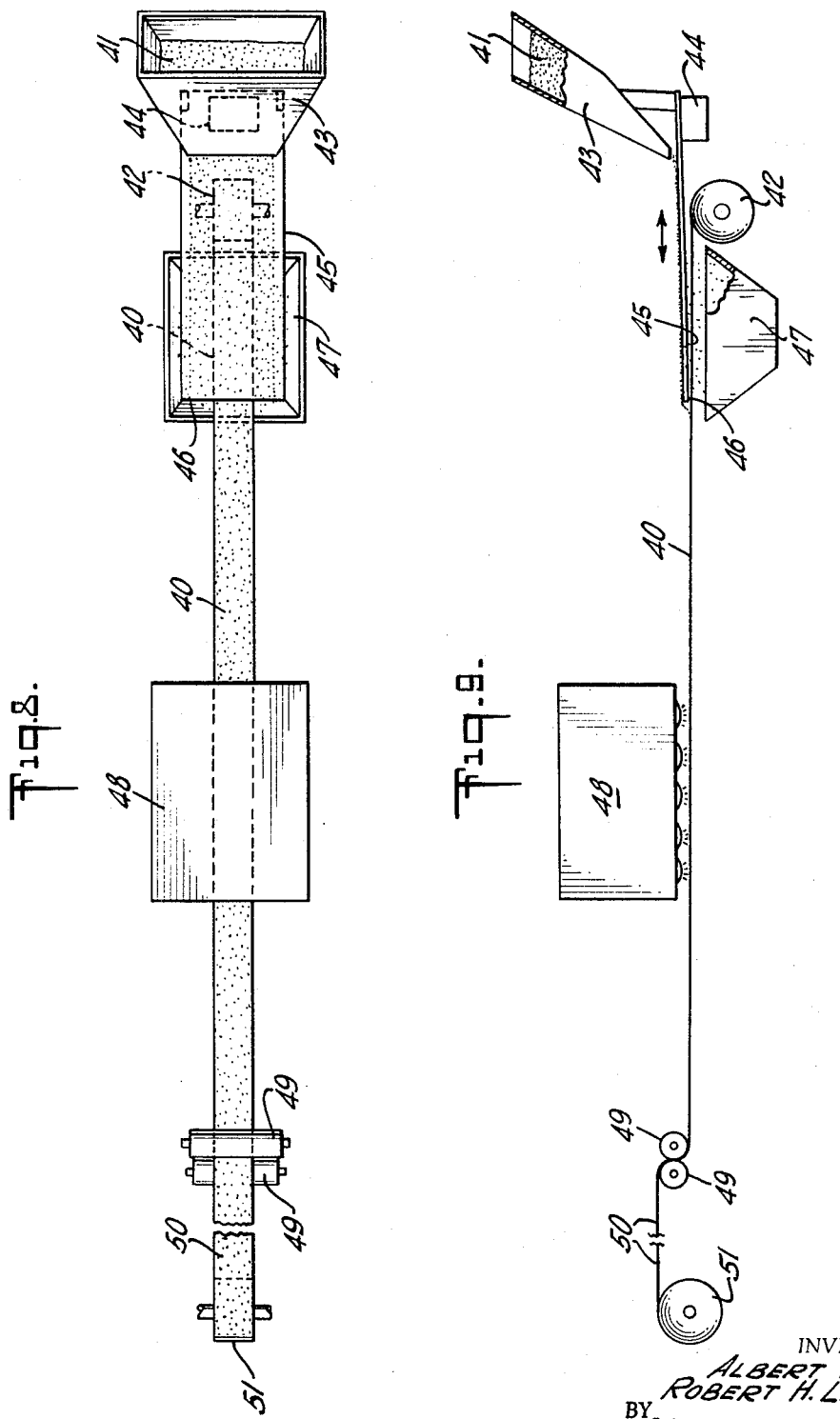

3,389,016
HEAT SEALABLE SHEET HAVING A THERMO-
PLASTIC SURFACE LAYER OF A MIXTURE OF
A POLYOLEFIN AND CERTAIN COPOLYMERS
OF POLYOLEFINS
Albert Holtz, Highland Park, and Robert H. Lamason,
Bound Brook, N.J., assignors to Johnson & Johnson, a
corporation of New Jersey
Filed Mar. 12, 1964, Ser. No. 351,391
12 Claims. (Cl. 117—122)

The present invention relates to heat sealable sheets and tapes having a normally non-tacky and thermoplastic layer which can be activated by heat for application to another surface, and more particularly to sheets of this type which are suitable for mending tapes and patches, labels, decorations, and other applications wherein they are permanently attached to clothing or other articles.

Heat sealable sheets and mending tapes which can be applied by various ironing techniques are well known. These sheets consist of a backing with a normally non-tacky thermoplastic layer bonded thereto by mechanical and polar molecular forces. When the sheet is heated, the thermoplastic layer is activated and becomes tacky and, under suitable pressure, the sheet will adhere to other materials with which it comes in contact. When the laminated structure is cooled, a bond is formed between the two materials through their mutual bond with the thermoplastic layer.

Heat sealable sheets and mending tapes have many consumer and industrial uses. For example, they are often used and applied in the home for mending sheets, clothes, and other similar items, for attaching name tapes to articles for easy identification; and for decorating clothing with fringes, designs, and other ornamental materials. Industrial uses include application of reinforcing patches to work clothes in spots subjected to continual and substantial stress, and commercial labeling and ornamental trimming of apparel.

Heat sealable sheets and tapes of this type should possess the following application and performance characteristics, i.e., (1) The normally non-tacky thermoplastic layer should be sufficiently activatable under the conditions of application, i.e., heat, pressure and time, that the underside of the layer will flow into, or penetrate the interstices of the secondary material to which it is being applied without the excessive penetration of the secondary material which would weaken the bond between the thermoplastic layer and the backing;

(2) The material of the thermoplastic layer must form a strong bond with both the backing and the secondary material which is resistant to dry cleaning and washing at elevated temperatures;

(3) The thermoplastic layer must not discolor on ironing since this changes the effective color of the tape; and (4) The thermoplastic layer must present a uniform and relatively smooth surface covering only that portion of the surface of the backing which is to be bonded to the secondary material.

Serious problems are presented in connection with the last-mentioned characteristic when the heat sealable sheet is in the form of a narrow tape, particularly when the tape has uneven or irregularly shaped edges or uneven surfaces. Thus, it has not heretofore been possible to produce a heat sealable rick-rack tape, i.e., one commonly used for decorative purposes and being narrow and having both uneven edges and uneven surfaces. One of the main reasons for this is that the prior art adhesive materials have been applied by knife coating or calender coating to one surface of the backing. In the past, the adhesive normally was in the form of a solution or organosol dispersion which was allowed to spill over the edges of the backing with the result that relatively thick beads of adhesive were formed along the longitudinal edges of the sheet. These beads were trimmed off to provide a uniform thickness of adhesive. Obviously, this technique is unsatisfactory for coating a narrow tape, particularly if the edges of the tape are uneven or irregular. Another technique used to avoid buildup of adhesive at the edges during coating, was to employ dams along the edges of the sheet. Again, this technique cannot be used for narrow tapes or sheets having irregular edges which must be retained in the final product.

We have discovered that these coating problems may be overcome by applying the thermoplastic material in the form of a free flowing thermoplastic powder deposited on one surface of the sheet by a metering device such as a vibrating hopper. The thermoplastic may be applied uniformly over the surface of the sheet by this technique since the excess merely drops over the edges into a collection pan provided for this purpose without buildup at the edges of the sheet. The powder is fixed in position and then adhered firmly to the backing by the application of heat and pressure thereto.

Although the above-described technique of coating with free flowing thermoplastic powders makes it possible to apply the termoplastic uniformly from edge to edge of the sheet, regardless of its configuration, the prior art thermoplastic adhesives used in producing heat sealable sheets can not be properly applied in powder form. Furthermore, the prior art thermoplastics have not been entirely satisfactory even when applied in the form of a solution or dispersion. That is to say, the prior art heat sealable sheets have not satisfactorily met requirements 1–3, above, in that discoloration of the the patched area occurs upon repeated exposure to heat, or bond strength is not sufficiently strong when subjected to the most demanding physical stresses, or problems have arisen during application due to the low thermoplastic activation temperature of the adhesive.

We therefore were faced with the problem of finding a thermoplastic substance which would meet all of the requirements for the production of heat sealable sheets and tapes of the type described and which, at the same time, could be provided in the form of a free flowing powder which could be applied to the backing in the manner described above. This invention solves this problem. We have provided a new thermoplastic sheet which comprises a backing and a normally non-tacky thermoplastic coating bonded thereto by mechanical and polar molecular forces; wherein the thermoplastic coating comprises a mixture of a polyolefin selected from the group consisting of polyethylene and polypropylene, and a coprises a mixture of a polyolefin selected from the group consisting of the lower aliphatic esters of acrylic acid and the lower aliphatic esters of vinyl alcohol. Our new thermoplastic sheet, or tape, meets all of the requirements set forth above and now makes possible the production of a heat sealable rick-rack tape, as well as any other narrow or irregular sheet or tape which previously could not be produced with the techniques and materials available.

We also have discovered that by varying the amounts of the polyolefin and the olefin copolymer in the thermoplastic mixture, as well as the ester proportions in the copolymer, we can produce heat sealable tapes having different application and performance characteristics most suitable to the intended use.

Regardless of the method of application of the thermoplastic, the heat sealable sheet or tape of this invention provides a superior bond between the backing and the secondary material which is resistant to dry cleaning and washing at elevated temperatures and which will not discolor under the most extreme conditions. Furthermore, the thermoplastic layer, itself, is sufficiently activatable under the conditions of application that it will penetrate properly into the interstices of the secondary material without weakening the bond between the thermoplastic layer and the backing.

The polymer component of the thermoplastic layer of this invention may be selected from a wide range of non-tacky, non-hygroscopic olefins which are free flowing in powder form. Various forms of polyethylene and polypropylene have been found to be advantageous for this purpose.

We have found that melt index and density are important physical properties of the polymer and the copolymer components of the thermoplastic mixture of the sheets of this invention and that there are normal and preferred ranges for these properties under typical application and performance characteristics such as illustrated in Table I, below. These conditions will be discussed more fully hereinafter.

weight of olefin. This preferred range includes those copolymers which have a reasonably high resistance to organic solvents and therefore can be used in large amounts in the copolymer-polymer blends described herein. The lower aliphatic acrylic and vinyl esters are those containing from about 1 to about 12 and preferably from about 2 to about 6 carbon atoms in the alkyl radical. This class of compounds includes such esters as ethyl acrylate, propyl acrylate, pentyl acrylate, 2-ethyl hexyl acrylate, decyl acrylate, vinyl acetate, vinyl propionate, vinyl butylate and the like. Among the olefin comonomers that are employed are ethylene, propylene, and the like.

As was the case with the polymer component of these thermoplastic compositions, the physical properties of the copolymer which are most important to the performance of these sheets are melt index and the density. If the sheets are to be applied and used under conditions similar to those noted in Table I, the copolymer selected should have a melt index of from about 2 to about 25 (ASTM D1238–57T gram per ten minutes) and preferably from about 5 to about 18, and a density of from about 0.92 to about 0.96 and preferably from about 0.93 to 0.95. A preferred embodiment of an olefin-aliphatic acrylate copolymer is "DQDA–2100" (82 parts ethylene to 18 parts ethyl acrylate, melt index 6, density .931, softening point by ball and ring method 307° F.) made by the Bakelite division of Union Carbide. A preferred embodiment of an olefin-vinyl ester copolymer is "DQDA 0867" (95 parts ethylene to 5 parts vinyl acetate, melt index 3, density .930) also made by Bakelite.

The relative amounts of polymer and copolymer components blended to form a given thermoplastic mixture of the present invention is dependent on the specific conditions for which the heat sealable sheet is designed to be applied and used. Table I illustrates conditions which are typical of those encountered during consumer and industrial applications and of those to which the sheets

TABLE I

|  | Consumer | Industrial |
|---|---|---|
| Application Conditions: |  |  |
| Pressure | 0.5–2 p.s.i. | 10–25 p.s.i. |
| Time | 15–30 seconds | 3–10 seconds. |
| Temperature | {350° F. (wool) / 425° F. (cotton)} | 375–450° F. |
| Performance Conditions: |  |  |
| Laundering: |  |  |
| Temperature | 140–150° F | 160–180° F. |
| Time | 30 minutes | 30 minutes. |
| Soap | Mild | Strong alkali. |
| Drying | 150° F | 150° F. |
| Drycleaning | Perchloroethylene, Stoddard solvent. | Perchloroethylene, Stoddard solvent. |
| Uses | Name tapes, patching, and other light uses. | Reinforcement patching of shirts, laboratory uniforms, and work clothes. |

If it is desired to produce a sheet for use under conditions similar to those listed in Table I, polymer components having a melt index of from about 10 to about 250 (ASTM D1238–57T gram per ten minutes) and preferably from about 30 to about 100, and a density of from about 0.92 to 0.98 and preferably from about 0.92 to 0.94 are used. Typical polyethylene resins having these physical properties are "Spencer 1709" (melt index 30–35, density .928), and "Spencer X145" (melt index 200, density .925), polyethylene resins made by Spencer Chemical Company; and "U.S.I. 270" (melt index 70, density .912), "U.S.I. P700X" (melt index 70, density .930), and "U.S.I. 250" (melt index 250, density .925), and polyethylene resins made by U.S. Industrial Chemical Company.

Almost any free flowing, non-tacky, nonhygroscopic copolymer of an olefin and a lower aliphatic ester of acrylic acid or a lower aliphatic ester of vinyl alcohol (comonomer) may be utilized as the copolymer component in this invention. However, the preferred embodiment designed for optimum performance under conditions given in Table I requires a copolymer containing less than about 33 parts ester by weight for every 100 parts by may be exposed during consumer and industrial uses.

In the home, heat sealable materials are usually applied by ironing at temperatures of from about 350 to about 425° F. and under the pressure of only the iron itself. These moderate conditions are possible because the housewife is satisfied if application of the sheet can be completed within from about 15 to about 30 seconds. Such a lengthy period is not practical when substantial volumes of production per unit time are required; and, hence, the time needed for industrial applications must be reduced to a more resonable period of from about 3 to about 10 seconds. In order to complete the lamination in this length of time, temperatures of from about 375° F. to 475° F. and pressures of from about 10 p.s.i. to about 25 p.s.i. are necessary. A thermoplastic mending sheet applied under a given set of conditions must form a strong bond with the surface to which it is applied so that the laminated structure can resist subsequent stresses. In order to do this, the thermoplastic substance must have a low enough temperature of thermoplastic activation so that it partially flows into the fibers of the material to which it is applied and yet does not flow to such an extent that a starved adhesive layer results.

Conditions under which fabrics are usually laundered in the home differ from those used by commercial establishments. Although the time required for washing and the time and temperature required for drying are substantially the same, the type of soap and chemicals used and the temperatures of the wash water do differ considerably. Commercial establishments use higher temperatures and strong alkali soaps and bleaches so as to fully "clean" a wide vartiety of clothes in large batches. Since it is difficult or impossible to predict whether a given thermoplastic tape will be subjected to household or commerical washing, the thermoplastic substances are blended so as to provide a bond which is sufficiently strong to resist laundering conditions far more rigorous than those listed in Table I.

Thermoplastic materials applied in both the home and in industry may be subjected to dry cleaning solvents; however, this occurrence is more likely in consumer uses of these tapes since one general purpose product may be applied to garments of many different types and fibers. On the other hand, many industrial applications concern the identification marking of shirts, work clothes, blue denims, etc. and the reinforcement patching of these items in spots that will be subjected to substantial wear. Few of these articles would ever be frequently exposed to drycleaning or other organic solvents; and thus, thermoplastic compositions designed for industrial application need not have extremely high resistance to organic solvents.

The thermoplastic mixtures of the present invention which are formulated to be used on tapes designed for consumer use under conditions corresponding to those illustrated in Table I and heretofore discussed, contain up to 75% copolymer and preferably from about 25% to about 75% copolymer. Thermoplastic tapes containing these formulations have the proper flow properties at the temperatures and pressures of consumer application, excellent solvent resistance, and a bond with good resistance to laundering and physical stresses. The blends compounded for industrial use contain at least 25% copolymer and preferably from about 75% to about 95% copolymer. These relative compositions provide the tape with the proper flow properties under industrial conditions of application, good dry cleaning resistance, and excellent resistance to laundering and other physical stresses. Thermoplastic mixtures for tapes used under other sets of conditions can also be easily obtained by proper blending. In general, an increase in the relative amounts of copolymer will result in stronger bonds, higher temperatures of themoplastic activation, and lower solvent resistance.

Other standard components of themoplastic compositions may be added to the mixtures heretofore described, although in practice they are not necessary. Conventional fillers may be used to impart color or opacity to the composition. Any of the usual plasticizers may be added.

The thermoplastic mixture applicable to produce sheets of this invention may be in any one of various forms. For instance, it may be in the form of a solution or an organosol dispersion as in the prior art. In fact, this may be preferred for certain products when the themoplastic mixture can be applied to the backing in wide widths by knife coating or calender coating. If the thermoplastic material must be applied to the backing in narrow widths, or if the edges of the backing are uneven or irregular and must be retained without trimming as for rick-rack tape, it is preferred, and indeed necessary in the case of rick-rack tape, that the thermoplastic mixture be applied in the form of a free flowing powder in the manner described and for the reasons given hereinbefore.

Other and further advantages of this invention will occur to one skilled in the art from the following description and claims taken together with the drawings wherein:

FIG. 1 is an enlarged schematic transverse sectional view of a heat sealable tape according to one embodiment of this invention;

FIG. 2 is a partly broken away schematic plan view of a rick-rack tape according to another embodiment of the invention;

FIG. 3 is an enlarged schematic plan view of still a different rick-rack tape according to this invention with the thermoplastic layer partly broken away to show the raised portions on the backing;

FIG. 4 is a more greatly enlarged schematic sectional view taken along the line 4—4 of FIG. 3;

FIG. 5 is a somewhat reduced schematic plan view illustrating a use of the rick-rack tape of FIGS. 3 and 4 for decorative purposes;

FIG. 6 is a somewhat enlarged schematic plan view of another rick-rack tape according to this invention partly broken away as in FIGS. 2 and 3;

FIG. 7 is a more greatly enlarged schematic sectional view taken along the line 7—7 of FIG. 6;

FIG. 8 is a schematic plan view of apparatus for applying the thermoplastic mixture to the backing according to a preferred method of this invention;

FIG. 9 is a schematic view in elevation of the apparatus and method of FIG. 8.

Referring to FIG. 1 of the drawings, there is shown a straight heat sealable tape 11 according to this invention which comprises a backing sheet 12 having even side edges 13 and 14, and a substantially uniform and even thermoplastic layer 15 bonded thereto by mechanical and polar molecular forces. The thermoplastic layer 15 comprises a mixture of a polyolefin selected from the group consisting of polyethylene and polypropylene polymers, and a copolymer of an olefin and an ester selected from the group consisting of the lower aliphatic esters of acrylic acid and the lower aliphatic esters of vinyl alcohol, as do all the other thermoplastic layers of this invention.

In FIG. 2, a rick-rack tape 16 having uneven side edges 17 is shown. This tape comprises a backing 18 having relatively even top and bottom surfaces whose side edges 17 follow a curved zig-zag path in substantially parallel alignment with one another. This causes the side edges of the tape to be uneven, i.e., not straight. Thus, the thermoplastic layer 19 of the rick-rack tape of FIG. 2 should be applied to the backing as a free flowing powder generally in accordance with the method which will be described hereinafter in connection with FIGS. 8 and 9.

A somewhat different and narrower rick-rack tape 20 is illustrated in FIGS. 3–5. This tape comprises a backing 21 which not only has uneven side edges 22 but uneven top and bottom surfaces 23 and 24, i.e., both of these surfaces comprise a set of three ridges, or raised portions 25, which run substantially parallel to the zig-zag side edges 22 of the backing. Thus, it can be said that these surfaces comprise alternating high and low portions, or alternating ridges and grooves, as best shown in FIG. 4. However, it will be seen that this tape comprises a thermoplastic layer 26 which fills in the low portions of the backing, is substantially uniform, and presents a relatively smooth and even outer surface 27 with no buildup of thermoplastic at the edges of the tape. This is made possible by applying the thermoplastic layer in the form of a free flowing powder in accordance with the method of FIGS. 8–9. As for the preceding figures, the thermoplastic layer 26 is bonded to the backing by mechanical and polar molecular forces which resist separation under the most extreme conditions.

The tape 20 of FIGS. 3–5 is quite flexible and capable of a variety of decorative uses. One of these is illustrated in FIG. 5 wherein the tape is curved and bent in such a way as to spell out the name "ANN" while maintaining the thermoplastic surface of the tape against the secondary material to which the tape is applied.

A somewhat different embodiment of the invention is illustrated in FIGS. 6 and 7, wherein a rick-rack tape 30 is shown which comprises a backing 31 having uneven top and bottom surfaces 32 and 33 and uneven side edges 34 which are not parallel with one another. The side edges 34 of the tape in FIGS. 6 and 7, while not parallel, are symmetrically arranged about the center line of the tape. As described in connection with the embodiment of FIGS. 3–5, both the top and bottom surfaces 32 and 33 of the tape comprise a set of three raised ridges 35, this time arranged symmetrically about the center line of the tape. Again, a thermoplastic layer 36 is applied in the form of a free flowing powder in such a way as to present a substantially even thermoplastic surface 37 at one side of the tape.

Referring to FIGS. 8 and 9, there is shown a method of applying a thermoplastic mixture to a backing 40 while the mixture is in the form of a free flowing powder 41, in accordance with a preferred embodiment of the invention. The backing 40 is drawn in the form of a thin strip from a supply roll 42 located underneath a vibrating hopper unit. The vibrating hopper unit comprises a wedge shaped hopper 43 containing a supply of the thermoplastic free flowing powder mixture 41, an electrical or mechanical vibrating element 44, and a vibrator plate 45 connected to the element and extending beneath a transverse slot in the bottom of the hopper 43 out over the backing strip 40. The hopper 43 is connected to the vibrating element 44 so that vibration of the unit causes the powder 41 to fall upon the vibrator plate 45 and move along the plate until it drops off the outer end 46 of the plate onto the backing strip 40 passing underneath the unit. By this technique, the powder is accurately metered onto the top surface of the backing in a uniform layer. The thickness of the thermoplastic layer applied at this point may be increased or decreased by varying the speed of the backing 40, the frequency of vibration, the size of the slot in the bottom of the hopper 43, etc. A pan 47 is positioned below the backing to collect any excess powder which may fall off the vibrator plate 45 or drop over the side edges of the backing.

The powder 41 is softened and fixed in position to some extent by passing the backing 40 carrying the powder underneath heating means such as a bank of infrared heat lamps 48 which applies heat thereto. Any suitable heating means, such as a heating oven, or the like, also may be used at this point.

Next the backing carrying the powder layer is passed through the nip formed by a pair of driven-pressure rollers 49 which preferably are heated so that they apply both heat and pressure to the thermoplastic layer to fix it firmly in position and bond it to the backing. Preferably, also, the application of pressure at this point assures that the top surface of the thermoplastic layer is substantially smooth and even for easy application to the secondary material. The resulting heat sealable tape 50, after suitable cooling, is wound in a roll 51 for storage.

The following Example I through XIII illustrate certain of features and properties of heat sealable sheets according to this invention. However, they are given only for the purpose of illustration and the invention should not be construed as limited thereto. The mixtures used in these examples may be useful for coating sheets or tapes designed either for consumer or industrial application.

Example I

A mixture of thermoplastic particles consisting of 75 parts by weight of a copolymer of ethylene and ethyl acrylate (82 parts ethylene/18 parts acrylate) having a melt index of 7 and a density of 0.931 (DQDA 2100-Union Carbide) and 25 parts by weight of a polyethylene resin having a melt index of 70 and a density of 0.930 (U.S.I. P700X-United States Industrial Chemical Company) is prepared at 20% solids in a toluene dispersion and knife coated at a dry coating weight of 3 ounces per square yard on a 80 x 72 cotton print cloth. The excess solvent is removed by air drying at room temperature and the cloth is slit into 1 inch wide strips.

A 1 inch and a 3 inch strip of the heat sealable tape thus prepared is applied at a temperature of 400° F. and under a pressure of 3.5 p.s.i. for 10 seconds to print cotton cloths having a 80 x 72 web. The cloth containing the 1 inch strip of tape is passed through a two-hour machine laundry cycle at 160° F. and machine-dried for twenty minutes at 150° F. The dry bond strength of the laminated structure is determined by measuring the tensile force necessary to separate the 1 inch strip of tape from the cloth on a Tinious-Olson tensile strength machine. 140 ounces is required. This high bond strength indicates that excessive penetration and a starved adhesive bond has not occurred and will not occur at industrial pressures of application. The bond strength is greater than 2 times that formed by sheets containing prior art thermoplastic materials and applied under similar conditions.

The resistance of the laminated structure to drycleaning is measured by immersing the cloth containing the 3-inch strip of tape in a solution of perchloroethylene for five minutes at a temperature of 80° F. A 300 gram weight is suspended from the end of the strip of tape and the length of the tape that has separated from the cloth at the end of 1 minute is measured. The tape that has not separated is taken as a measure of drycleaning resistance. The structure has acceptable drycleaning resistance if the entire tape has not separated from the cloth in this period of time. In this instance none of the tape has separated from the cloth by the end of the one minute period.

A clear, transparent film of said thermoplastic mixture is prepared by milling the mixture of particles for 10 minutes in a double roll steel roller mill. The back steel roll is kept at a temperature of 200° F. and the resin is sheeted out through the rolls in film form. The film prepared in this manner is placed between two silicon interliners and pressed under a pressure of 2 p.s.i. for 30 second at 450° F. No discoloration of the film occurs.

Example II

The procedure of Example I is followed substantially as set forth therein except that the tape is applied to the cotton cloths in 15 seconds at a temperature of 350° F. and under a pressure of 1.7 p.s.i.

The dry bond strength is determined to be 130 ounces, approximately 2 to 2.5 times as great as that formed by sheets containing prior art thermoplastic substances applied under comparable conditions. The dry cleaning resistance is 3 inches and no discoloration of the laminated structure occurs as a result of ironing.

Example III

The procedure of Example I again is followed substantially as set therein except that the thermoplastic mixture consists of 75 parts by weight of a copolymer of ethylene and ethyl acrylate (82 parts ethylene/18 parts acrylate), having a melt index of 7 and a density of 0.931 (DQDA 2100-Union Carbide) and 25 parts by weight of a polyethylene resin having a melt index of 250 and a density of 0.925 (U.S.I. 250-United States Industrial Chemical Company); and the tape is applied to the cotton cloths in 15 seconds at a temperature of 350° F. and under a pressure of 1.7 p.s.i.

The dry bond strength is 152 ounces, approximately 2 to 3 times as great as that formed by sheets containing prior art thermoplastic substances applied under comparable conditions. The drycleaning resistance is 2½ inches and no discoloration of the laminated structure occurs as a result of ironing.

The copolymer content in the mixtures of Examples IV through VIII is in the range preferred for tapes designed for consumer uses.

Example IV

A heat sealable tape is produced substantially as described in Example I except that the thermoplastic mixture consists of 50 parts by weight of a copolymer of ethylene and ethyl acrylate (82 parts ethylene/18 parts acrylate) having a melt index of 7 and a density of 0.931 (DQDA 2100-Union Carbide) and 50 parts by weight of a polyethylene resin having a melt index of 70 and a density of .912 (U.S.I. 270-United States Industrial Chemical Company); and the tape is applied to the cotton cloths in 15 seconds at a temperature of 350° F. and under a pressure of 1.7 p.s.i.

The dry bond strength is 121 ounces, from about 1.5 to 2.5 times as great as that formed by tapes coated with prior art thermoplastic substances and applied under corresponding conditions. The drycleaning resistance is 1¾ inches and no discoloration of the laminated structure occurs as a result of ironing.

Example V

Another tape is produced substantially as described in Example I except that the thermoplastic mixture consists of 50 parts by weight of a copolymer of ethylene and ethyl acrylate (82 parts ethylene/18 parts acrylate) having a melt index of 7 and a density of 0.931 (DQDA 2100-Union Carbide) and 50 parts by weight of a polyethylene resin having a melt index of 200 and a density of 0.925 (Spencer X145-Spencer Chemical Company); and the tape is applied to the cotton cloths in 15 seconds at a temperature of 350° F. and under a pressure of 1.7 p.s.i.

The dry bond strength is 96 ounces and the dry cleaning resistance is 1½ inches. This bond strength is from about 1.5 to about 2 times as great as that formed by tapes coated with prior art thermoplastic substances and applied under corresponding conditions. No discoloration of the laminated structure occurs as a result of ironing.

Example VI

The procedure of Example I is followed substantially as set forth therein except that the thermoplastic mixture consists of 50 parts by weight of a copolymer of ethylene and ethyl acrylate (82 parts ethylene/18 parts acrylate) having a melt index of 7 and a density of 0.931 (DQDA 2100-Union Carbide) and 50 parts by weight of a polyethylene resin having a melt index of 70 and a density of 0.930 (U.S.I. P700X-United States Industrial Chemical Company); and the tape is applied to the cotton cloths in 15 seconds at a temperature of 350° F. and under a pressure of 1.7 p.s.i.

The dry bond strength is 120 ounces, from about 1.5 to about 2.5 times as great as that formed by tapes coated with prior art thermoplastic substances and applied under corresponding conditions. The dry cleaning resistance is 3 inches. No discoloration of the laminated structure occurs as a result of ironing.

Example VII

The procedure of Example I is again followed substantially as described except that the thermoplastic mixture consists of 33 parts by weight of a copolymer of ethylene and ethyl acrylate (82 parts ethylene/18 parts acrylate) having a melt index of 7 and a density of 0.931 (DQDA 2100-Union Carbide) and 67 parts by weight of a polyethylene resin having a melt index of 30 and a density of 0.928 (Spencer 1709-Spencer Chemical Company); and the tape is applied to the cotton cloths in 15 seconds at a temperature of 350° F. and under a pressure of 1.7 p.s.i.

The dry bond strength is 91 ounces. This bond strength is from about 1.5 to about 2 times as great as that formed by tapes coated with prior art thermoplastic substances and applied under corresponding conditions. The dry cleaning resistance is 3 inches. No discoloration of the laminated structure occurs as a result of ironing.

Example VIII

A tape is manufactured substantially as described in Example I except that the thermoplastic mixture consists of 50 parts by weight of a copolymer of ethylene and vinyl acetate (95 parts ethylene/5 parts vinyl acetate) having a melt index of 3 and a density of 0.932 (DQDA 0867-Union Carbide) and 50 parts by weight of a polyethylene resin having a melt index of 70 and a density of 0.912 (U.S.I. 270-United States Industrial Chemical Company); and the tape is applied to the cotton cloths in 15 seconds under a pressure of 1.7 p.s.i.

The dry bond strength is 128 ounces, from about 1.5 to 2.5 times that formed by tapes containing prior art thermoplastic substances and applied under similar conditions. The dry cleaning resistance is 3 inches and no discoloration of the laminated structure occurs as a result of ironing.

The tapes of Examples IX through XI contain thermoplastic mixtures which have a copolymer content in the lower limit of the range of that preferred for tapes designed for consumer uses.

Example IX

A tape is manufactured substantially according to Example I except that the thermoplastic mixture consists of 25 parts by weight of a copolymer of ethylene and ethyl acrylate (82 parts ethylene/18 parts acrylate) having a melt index of 7 and a density of 0.931 (DQDA 2100-Union Carbide) and 75 parts by weight of a polyethylene resin having a melt index of 250 and a density of 0.925 (U.S.I. 250-United States Industrial Chemical Company); and the tape is applied to the cotton cloths in 15 seconds at a temperature of 350° F. and under a pressure of 1.7 p.s.i.

The dry bond strength is 84 ounces, substantially greater than that of tapes containing prior art compositions applied under comparable conditions. The dry cleaning resistance is 3 inches. No discoloration of the laminated structure occurs as a result of ironing.

Example X

The procedure of Example I again is followed substantially as set forth therein except that the thermoplastic mixture consists of 25 parts by weight of a copolymer of ethylene and ethyl acrylate (82 parts ethylene/18 parts acrylate) having a melt index of 7 and a density of 0.931 (DQDA 2100-Union Carbide) and 75 parts by weight of a polyethylene resin having a melt index of 70 and a density of 0.930 (U.S.I. P700X-United States Industrial Chemical Company); and the tape is applied to the cotton cloths in 15 seconds at a temperature of 350° F. and under pressure of 1.7 p.s.i.

The dry bond is 100 ounces, substantially greater than that of tapes containing prior art compositions applied under comparable conditions. The dry cleaning resistance is 3 inches and no discoloration of the laminated structure occurs as a result of ironing.

Example XI

The procedure of Example I is followed substantially as set forth therein except that the thermoplastic mixture consists of 25 parts by weight of a copolymer of ethylene and vinyl acetate (95 parts ethylene/5 parts vinyl acetate) having a melt index of 3 and a density of 0.932 (DQDA 0867-Union Carbide) and 75 parts by weight of a polyethylene resin having a melt index of 70 and a density of 0.912 (U.S.I. 270-United States Industrial Chemical Company); and the tape is applied to the cotton cloths in 15 seconds under a pressure of 1.7 p.s.i.

The dry bond is 64 ounces and the dry cleaning resistance is 3 inches. No discoloration of the laminated structure occurs as a result of ironing.

The results of Examples I–XI are presented in the following table.

| Examples | I | II | III | IV | V | VI | VII | VIII | IX | X | XI |
|---|---|---|---|---|---|---|---|---|---|---|---|
| Composition of Thermoplastic Mixture (parts by weight): | | | | | | | | | | | |
| (a) Polymer Components: | | | | | | | | | | | |
| Polyethylene resin (M.I., 30; density, 0.928) (Spencer 1709) | | | | | | | 67 | | | | |
| Polyethylene resin (M.I., 200; density, 0.925) (Spencer X145) | | | | | | 50 | | | | | |
| Polyethylene resin (M.I., 70; density, 0.912) (U.S.I. 270) | | | | 50 | 50 | | | | | | 75 |
| Polyethylene resin (M.I., 250; density, 0.925) (U.S.I. 250) | | | 25 | | | | | | 75 | | |
| Polyethylene resin (M.I., 70; density, 0.930) (U.S.I. P700X) | 25 | 25 | | | | | | 50 | | 75 | |
| (b) Copolymer Components: | | | | | | | | | | | |
| Ethylene-ethylacrylate copolymer (M.I., 7; density, 0.931; 82% ethylene) (DQDA 2100) | 75 | 75 | 75 | 50 | 50 | 50 | 33 | | 25 | 25 | |
| Ethylene-vinyl acetate copolymer (M.I., 3; density, 0.932; 95% ethylene) (DQDA 0867) | | | | | | | | 50 | | | 25 |
| Conditions of Application: | | | | | | | | | | | |
| Time (seconds) | 10 | 15 | 15 | 15 | 15 | 15 | 15 | 15 | 15 | 15 | 15 |
| Temperature (°F.) | 400 | 350 | 350 | 350 | 350 | 350 | 350 | 400 | 350 | 350 | 400 |
| Pressure (p.s.i.) | 3.5 | 1.7 | 1.7 | 1.7 | 1.7 | 1.7 | 1.7 | 1.7 | 1.7 | 1.7 | 1.7 |
| Test Results: | | | | | | | | | | | |
| Dry bond (oz./in.) | 140 | 130 | 152 | 121 | 96 | 120 | 91 | 128 | 84 | 100 | 64 |
| Dry cleaning resistance (in.) | 3 | 3 | 2½ | 1¾ | 1½ | 3 | 3 | 3 | 3 | 3 | 3 |

Example XII 75 parts by weight of a copolymer of ethylene and ethyl acrylate (82 parts ethylene/18 parts ethyl acrylate) having a melt index of 7 and a density of 0.931 (DQDA 2100-Union Carbide), and 25 parts of a polyethylene resin having a melt index of 70 and a density of 0.931 (U.S.I. P700X-United States Industrial Chemical Company), are blended for 30 minutes in a rotating sigma blender. The free flowing thermoplastic powder mixture thus formed is uniformly metered at a dry coating weight of 3 ounces per square yard onto a backing by the method illustrated in FIGS. 8 and 9 and previously described in the specification. The backing is about 1/64 inch thick and 1/8 inch wide from edge to edge and about 1/4 inch wide from peak to peak irregularly shaped zig-zag woven cotton backing of the type illustrated in FIGS. 3–5. The edges of the backing make an 80°–90° change of direction about every 1/4 inch. The resulting heat sealable tape contains a uniform layer of thermoplastic substance; no thermoplastic substance is bonded to the sides or bottom surface of said backing.

A strip of said heat sealable tape is applied by ironing at a temperature of 350° F. and under a pressure of 1.7 p.s.i. for 15 seconds to a print cotton cloth having an 80 x 72 web. The laminated structure has a flat, uniform appearance and no loose edges.

The actual dry cleaning resistance and dry bond strength cannot be measured in terms corresponding to those described previously because of the irregular shape of the tape. However, when cloths to which said tape has been applied are subjected to the conditions of the washing and dry cleaning tests heretofore described, separation of the laminated structure does not occur and weakening of the bond is not evident.

Example XIII

The procedure of Example XII is followed substantially as set forth therein except that the thermoplastic mixture consists of 75 parts of a copolymer of ethylene and vinyl acetate (95 parts ethylene/5 parts vinyl acetate) having a melt index of 3 and a density of 0.932 (DQDA 0867-Union Carbide) and 25 parts of polyethylene resin having a melt index of 70 and a density of 0.930 (U.S.I. P700X-United States Industrial Chemical Company). Results equivalent to those in Example XII are obtained.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

We claim:

1. A heat sealable sheet material comprising a thin, flexible backing and a thin, flexible normally non-tacky thermoplastic coating bonded thereto by mechanical and polar moleculular forces; said thermoplastic coating consisting essentially of a mixture of from about 5 to about 75% by weight of a polyolefin selected from the group consisting of polyethylene and polypropylene and from about 25% to about 95% by weight of a copolymer of an olefin and a terminally unsaturated ester selected from the group consisting of the lower aliphatic esters of acrylic acid and the lower aliphatic esters of vinyl alcohol, said polyolefin having a melt index of from about 30 to about 250 and a density of from about 0.92 to about 0.98 and said copolymer having a melt index of from about 2 to about 25 and a density of from about 0.92 to about 0.96, and said terminally unsaturated ester being present in said copolymer in an amount of from about 5% to about 25% by weight.

2. A heat sealable sheet material according to claim 1, wherein said polyolefin is polyethylene and said terminally unsaturated ester is a lower aliphatic ester of acrylic acid.

3. A heat sealable sheet material according to claim 1, wherein said polyolefin is polyethylene and said terminally unsaturated ester is a lower aliphatic ester of vinyl alcohol.

4. A heat sealable sheet material according to claim 1, wherein said polyolefin has a melt index of from about 30 to about 100 and a density of from about 0.92 to about 0.94 and wherein said copolymer has a melt index of from about 5 to about 18 and a density of from about 0.93 to about 0.95.

5. A heat sealable sheet material of claim 1 in which said polyolefin in said mixture is present in an amount of from about 5 to about 25% by weight and in which said copolymer is present in an amount of from about 75% to about 95% by weight.

6. A heat sealable sheet material according to claim 2, wherein said olefin component in said copolymer is ethylene and said terminally unsaturated ester is a lower aliphatic ester of acrylic acid.

7. A heat sealable sheet material according to claim 2, wherein said olefin component in said copolymer is ethylene and said terminally unsaturated ester is a lower aliphatic ester of vinyl alcohol.

8. A heat sealable sheet material according to claim 4, wherein said polyolefin is polyethylene, said olefin in said copolymer is ethylene, and said terminally unsaturated ester is vinyl acetate.

9. A heat sealable sheet material according to claim 4, wherein said polyolefin is polyethylene, said olefin in said copolymer is ethylene, and said terminally unsaturated ester is ethyl acrylate.

10. A heat sealable sheet material of claim 4, in which said polyolefin in said mixture is present in an amount of from about 5 to about 25% by weight and in which said copolymer is present in an amount of from about 75% to about 95% by weight.

11. A heat sealable sheet material according to claim 6, wherein said lower aliphatic ester of acrylic acid is ethyl acrylate.

12. A heat sealable sheet material according to claim 7, wherein said lower aliphatic ester of vinyl alcohol is vinyl acetate.

References Cited

UNITED STATES PATENTS

| | | | |
|---|---|---|---|
| 2,853,404 | 9/1958 | Weinberg | 117—122 |
| 2,953,541 | 9/1960 | Pecha et al. | 260—455 |
| 3,196,040 | 7/1965 | Kane | 117—76 |
| 3,294,722 | 12/1966 | Apikos et al. | 260—28.5 |
| 3,306,882 | 2/1967 | Pullen et al. | 260—28.5 |
| 3,318,977 | 5/1967 | Battersby et al. | 260—889 |
| 3,322,708 | 5/1967 | Wilson | 260—28.5 |
| 3,325,431 | 6/1967 | McManus | 260—28.5 |
| 3,326,833 | 6/1967 | Raley | 260—28.5 |
| 1,345,627 | 7/1920 | Overbury | 117—5 |
| 3,025,167 | 3/1962 | Butler | 117—122 X |
| 3,201,498 | 7/1965 | Brunson et al. | 260—897 |
| 3,244,687 | 4/1966 | Spindler | 260—897 X |
| 3,245,931 | 4/1966 | Matthew | 260—897 X |
| 3,250,639 | 5/1966 | Stead | 117—122 X |
| 3,264,336 | 8/1966 | Hedge | 117—122 X |

OTHER REFERENCES

Boenig, H. V.: "Polyolefins—Structure and Properties," Elsevier Pub. Co. (1966).

Sears, Roebuck and Co.: Fall and Winter catalog (1962), No. 225, pp. 317 and 318.

WILLIAM D. MARTIN, *Primary Examiner.*

W. D. HERRICK, *Assistant Examiner.*

UNITED STATES PATENT OFFICE
CERTIFICATE OF CORRECTION

Patent No. 3,389,016

June 18, 1968

Albert Holtz et al.

It is certified that error appears in the above identified patent and that said Letters Patent are hereby corrected as shown below:

Column 14, line 9, "3,264,336" should read -- 3,264,136

Signed and sealed this 2nd day of December 1969.

(SEAL)
Attest:

Edward M. Fletcher, Jr.
Attesting Officer

WILLIAM E. SCHUYLER,
Commissioner of Patents